July 20, 1937.  C. N. JACOBS  2,087,256
NONMETALLIC GEAR, PULLEY, OR THE LIKE
Filed Nov. 18, 1933  2 Sheets-Sheet 1

WITNESS:

INVENTOR
Clifton N. Jacobs
BY
ATTORNEYS.

July 20, 1937.  C. N. JACOBS  2,087,256
NONMETALLIC GEAR, PULLEY, OR THE LIKE
Filed Nov. 18, 1933  2 Sheets-Sheet 2

WITNESS:

INVENTOR
Clifton N. Jacobs
BY
ATTORNEYS.

Patented July 20, 1937

2,087,256

UNITED STATES PATENT OFFICE 2,087,256

NONMETALLIC GEAR, PULLEY, OR THE LIKE

Clifton N. Jacobs, Norristown, Pa., assignor, by mesne assignments, to Taylor Fibre Company, Norristown, Pa., a corporation of Pennsylvania Application November 18, 1933, Serial No. 698,560

9 Claims. (Cl. 74—445)

This invention relates to an improvement in non-metallic gear, pulley or the like, and more particularly to such formed by compression of fabric impregnated with a binder.

Gears, pulleys or the like of the type to which this invention relates comprise a rim, web and hub portions, the rim and hub portions being thickened and joined by the web portion, which is customarily relatively thin. The periphery of the rim portion forms the face of a pulley, or teeth are cut into it in the case of a gear. The web portion has been variously solid or formed with openings, or cut out, to give a spoke structure.

Such gears, pulleys or the like have been heretofore usually formed by compression, in a heated mold, of fibrous textile fabric, as duck, canvas, or the like, impregnated with a binder, as a thermoplastic resin, or a thermosetting resin, as a phenol-formaldehyde resin, which will flow and take form and become insoluble and infusible under heat and pressure. The various parts of a gear or pulley, as the rim, web and hub have been formed variously from rings or washers and discs, of resin impregnated fabric, and from discs and segments of a ring, to form the hub and web portions and the rim portions respectively, it being customary to utilize a filler in connection with the discs for formation of the hub portion. Variously, the hub portion is reinforced with a metallic liner or sleeve.

Now, in accordance with this invention, there is provided a gear, pulley, or the like, formed by the compression of elements of fabric impregnated with a binder and adapted for the formation of rim, web and hub portions, the elements being of particular novel and advantageous shape such that the hub portion may be readily formed without the use of any filler, a spoke structure may be obtained readily, if desired, and the web portion will be more effectively tied in to and consolidated with the rim portion than in structures heretofore produced.

More particularly, in accordance with this invention the elements adapted for forming the hub and web portions and the rim portion are composed of fabric impregnated with a thermoplastic or a thermosetting binder and are of angular form, a plurality of which may be integral in a single element and a plurality of which are laid up in overlapping relationship, with those forming the web so related to those forming the rim that upon compression they will become definitely interlocked, not only through the flow of the thermoplastic binder, but also by the extension under pressure of portions of the web elements into recesses formed between the rim elements by virtue of their angular shape and by the corresponding extension under pressure of portions of rim elements into recesses formed between web elements.

Having now indicated in a general way the nature and purpose of this invention, I will proceed to a detailed description of a preferred embodiment thereof, with reference to the accompanying drawings, in which.

Figure 1:
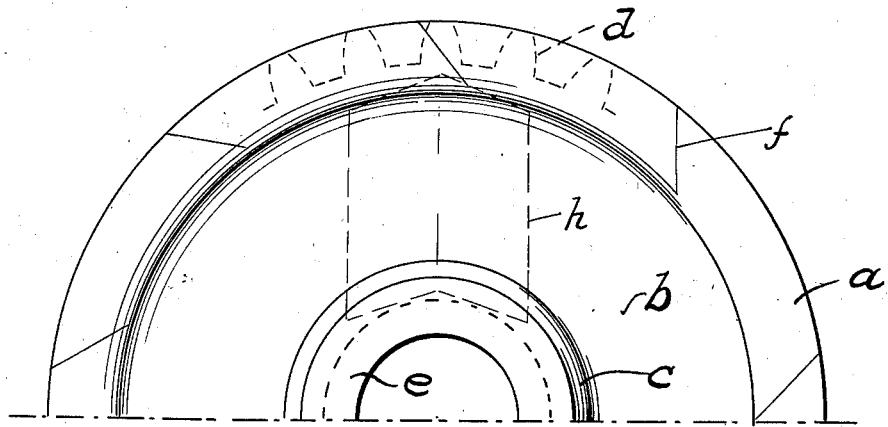
Figure 1 is a plan view of one half of a gear or pulley embodying this invention.
Figure 2:
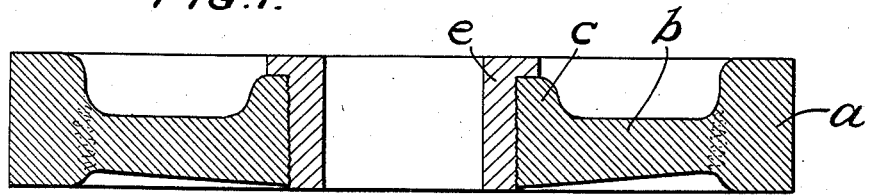
Figure 2 is a sectional view of the subject of Figure 1, with the interlocking of the web and rim elements indicated.

Referring to Figures 1 and 2, $a$ indicates the rim portion, $b$ the web portion and $c$ the hub portion of a pulley, or, if teeth $d$ be cut in the periphery of the rim portion $a$, a gear. The hub portion of the pulley or gear shown is reinforced by means of a metallic sleeve $e$.

The gear or pulley shown is formed by compression, under suitable temperature, of elements, adapted for the formation of the web $b$ and hub $c$ and for the formation of the rim $a$, composed of cotton, duck, or other suitable woven or felted fabric, impregnated with a phenol-formaldehyde resin, or other suitable thermoplastic or thermosetting resin or other binder for the purpose.

Figure 3:
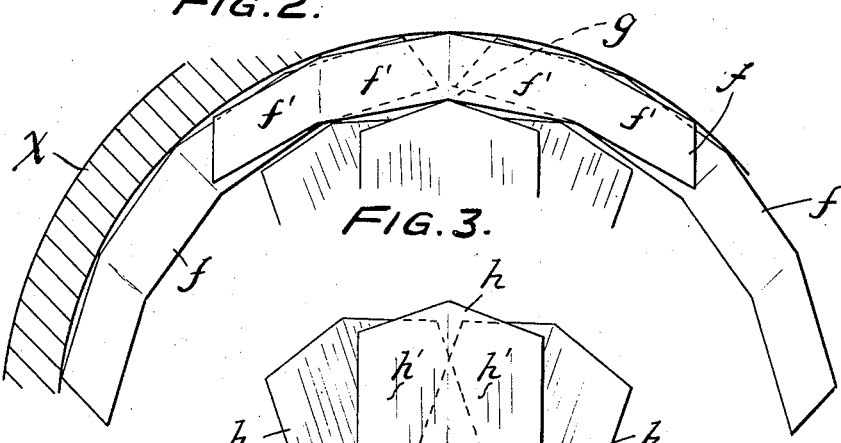
Figure 3 is a diagrammatic view illustrating the relative lay up of rim and web sections in a mold.
Figure 4:
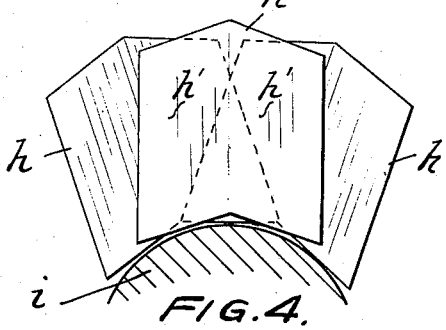
Figure 4 is a diagrammatic view illustrating the lay up of web sections relative to the hub portion of a gear or pulley.

Referring now to Figures 3 and 4, the rim forming elements $f$ are of angular form and may, as shown for illustrative purposes, comprise a plurality of parallelogram shaped sections $f$, $f'$ arranged end to end generally about a center, so that the elements may be laid up about a center and will present re-entrant angles on their inner edges.

For the formation of the rim portion of the gear or pulley the rim elements *f* are laid up in a mold, the outer wall of which is indicated at *x* Figure 3, in overlapping and break joint relation about the center of the mold with the result that recesses or cells *g* are formed between overlapped elements at points due to non-alignment of the inner edges of overlapped elements, all as shown in Figure 2.

The web and hub forming elements *h* are of angular form and may, as shown for illustrative purposes, comprise parallelogram shaped sections *h'*, *h'* arranged side by side, it being noted that the sections will desirably not be rectangular in order that the elements respectively will present a re-entrant angle at one end and a salient angle at the other end.

For the formation of the web and hub portions the web elements *h* are laid up in overlapping relation about the center pin *i* of the mold, or a metal sleeve, if one be used. The elements *h* are laid up in the mold to extend generally radially from the center toward the laid up rim element so that their overlap is greatest adjacent to the center and with their salient angles adjacent to the rim elements. Recesses or cells *g'* will be formed between web elements.

In the formation of a gear or pulley the elements described having been laid up in a mold of any known or desired type are subjected to heat and pressure, which causes the thermoplastic binder to flow and compresses and consolidates the binder and fabric of the elements into an integral mass, in which the web elements, due to their angular form, are extended into recesses between rim elements, and vice versa, formed by virtue of the angular form of rim elements, so that the web and the rim are securely interlocked not only by the flowing together of the binder, but by an interlocking of the fabric components of the web and rim. As will be obvious the hub portion *c* is provided for, without necessity for filler, by the excess material available at the hub portion due to the larger overlap of the elements *h* at the center of the mold.

Figure 5:
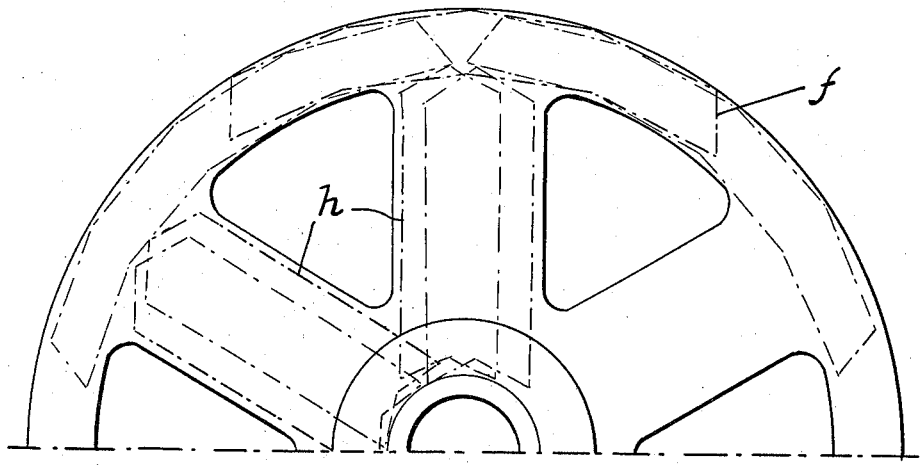
Figure 5 is a diagrammatic view of one-half of a pulley having a spoke structure and illustrating the lay up of rim and web elements.

Referring now to Figure 5, it will be obvious that the web and hub forming elements and the rim elements described lend themselves to the formation of gears, pulleys and the like of spoke structure, it being noted that for the formation of such a structure the rim elements are laid up as described above while the web elements are superimposed in overlapped relation to form spokes, the exact shape of which is determined by the form of mold to which the web elements are conformed under pressure.

Figure 6:
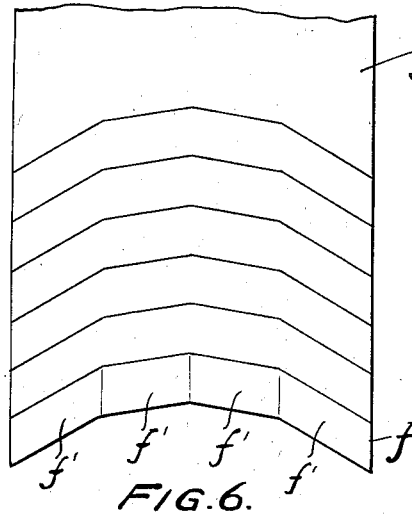
Figure 6 is a plan view of a length of impregnated fabric illustrating the formation of rim elements therefrom.
Figure 7:
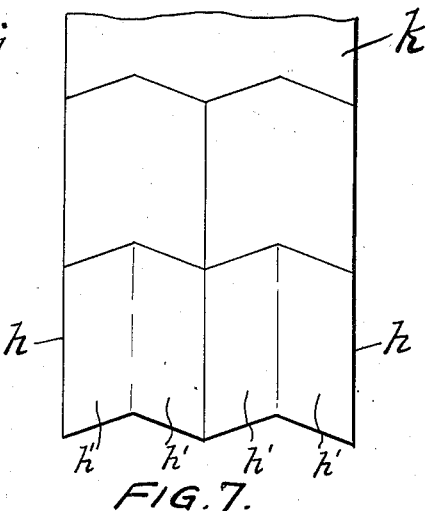
Figure 7 is a plan view of a length of fabric illustrating the formation of web elements therefrom.
Figure 8:
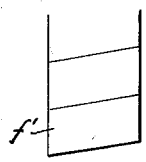
Figures 8 and 9 illustrate modified forms of rim elements as they may be formed from a strip.
Figure 9:
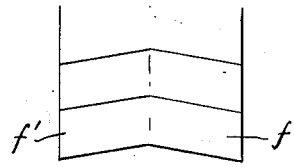

Referring now to Figures 6 and 7, it will be noted that the rim elements *f* may be cut from a strip of material *j*, previously impregnated with a binder without waste and likewise the web elements *h* may be cut from a strip *k*.

It will be understood that from the broad standpoint this invention involves a non-metallic gear, pulley or the like of solid or spoke structure, formed by compression of separate rim and web elements of angular form. More particularly, the hub portion of the gear, pulley or the like, will be formed integrally with the web without the use of filler.

Further, it will be understood that the web and rim elements may comprise any suitable fabric, of which cotton duck is illustrative, impregnated with any suitable binder, of which a phenol-formaldehyde thermosetting resin is illustrative.

What I claim and desire to protect by Letters Patent is:

1. A gear, pulley, or the like, including a rim comprising a plurality of elements composed of fabric impregnated with a binder and having a re-entrant angle in their inner edge arranged in layers in overlapping, break joint relation about a center and a web comprising angular elements composed of fabric impregnated with a binder and having a salient angle in their outer ends arranged in overlapping relation and extending radially within the rim, said elements being compressed.

2. A gear, pulley, or the like, including a rim comprising a plurality of elements composed of fabric impregnated with a binder and having a re-entrant angle in one edge and a salient angle in the other edge arranged in layers in overlapping, break joint relation about a center and a web comprising angular elements composed of fabric impregnated with a binder and having a re-entrant angle and a salient angle in opposite ends arranged in overlapping relation within the rim and extending radially thereof with their ends having a salient angle adjacent thereto, said elements being compressed and rim and web elements being interlocked.

3. A gear, pulley, or the like, including a rim comprising a plurality of elements composed of fabric impregnated with a binder and having a re-entrant angle in one edge and a salient angle in the other edge arranged in layers in overlapping, break joint relation about a center whereby recesses are formed between rim elements in adjacent layers and a web comprising angular elements composed of fabric impregnated with a binder and having a re-entrant angle and a salient angle in opposite ends arranged in overlapping relation within the rim and extending radially thereof with their ends having a re-entrant angle remote therefrom and having salient angles thereof extending into recesses formed between rim elements in adjacent layers, said elements being compressed.

4. A gear, pulley, or the like, including a rim composed of a plurality of elements comprising sections of parallelogram form composed of fabric arranged in layers in overlapping, break joint relation about a center and a web comprising elements comprising sections of parallelogram form composed of fabric arranged in overlapping relation within the rim, said web and rim elements being compressed and a binder for retaining said elements under compression.

5. A gear, pulley, or the like, including a rim comprising a plurality of elements composed of sections of fabric extending in angular relationship arranged in layers in overlapping break joint relation about a center, and a web comprising fabric elements each composed of a plurality of angularly related sections of parallelogram form, said web elements being arranged in overlapping relation within the rim, said web and rim elements being compressed and a binder for retaining said elements under compression.

6. A gear, pulley, or the like, including a rim and a web, respectively, formed by compression of overlapped elements, the rim elements being composed of sections of parallelogram form, said elements comprising fabric impregnated with a binder.

7. A gear, pulley, or the like, including a rim comprising a plurality of elements composed of fabric impregnated with a binder and having a re-entrant angle in one edge arranged in layers in overlapping, break joint relation about a center and a web comprising angular elements composed of fabric impregnated with a binder and having a salient angle in their outer ends arranged in overlapping relation within the rim and extending radially thereof with their outer ends adjacent thereto, said elements being compressed and rim and web elements being interlocked.

8. A gear, pulley, or the like, including a rim comprising a plurality of elements composed of fabric impregnated with a binder and having a re-entrant angle in one edge arranged in layers in overlapping, break joint relation about a center whereby recesses are formed between rim elements and a web comprising elements composed of fabric impregnated with a binder and having a salient angle in their outer ends arranged in overlapping relation within the rim and extending radially thereof with their outer ends extending into recesses formed between rim elements, said elements being compressed.

9. A gear, pulley, or the like, including a rim and a web respectively formed by compression of overlapped elements, the rim and web elements respectively being composed of sections of parallelogram form, said elements comprising fabric impregnated with a binder.

CLIFTON N. JACOBS.